Dec. 30, 1941.   H. SAUER   2,267,952
STEREOSCOPIC CAMERA
Filed Feb. 24, 1939
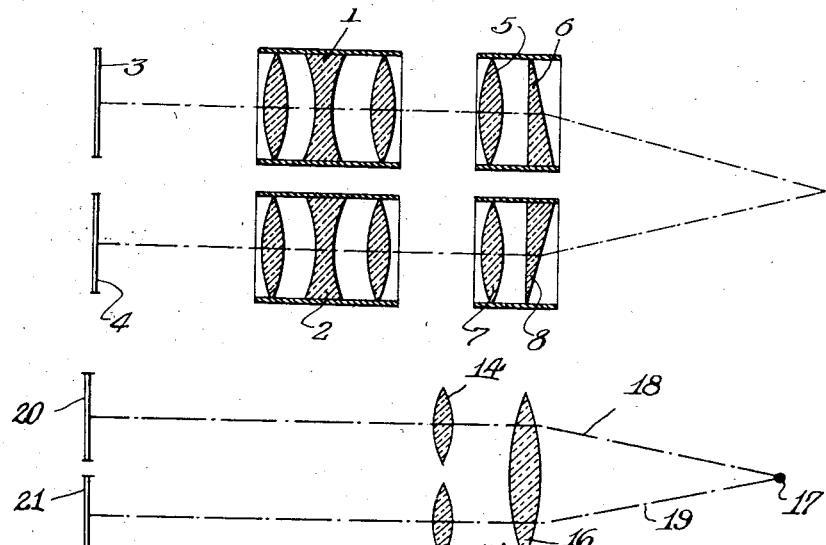
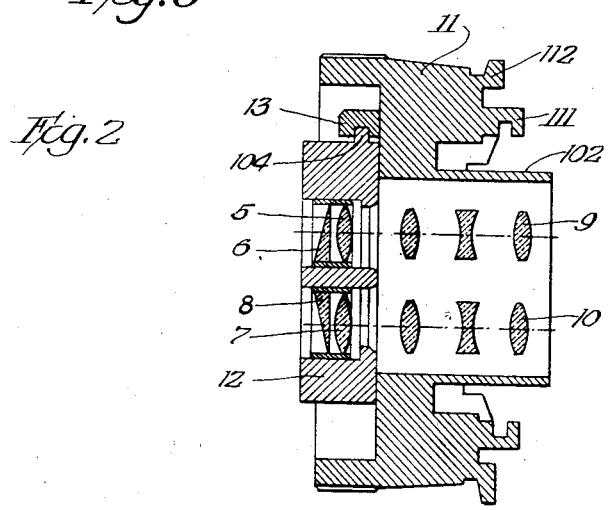
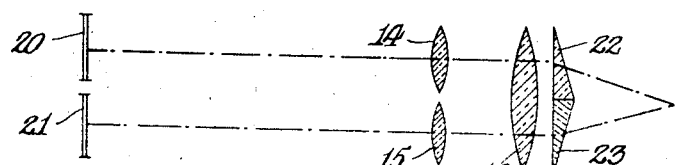
Inventor:
Hans Sauer Patented Dec. 30, 1941

2,267,952

UNITED STATES PATENT OFFICE 2,267,952

STEREOSCOPIC CAMERA

Hans Sauer, Dresden, Germany, assignor to Zeiss Ikon Aktiengesellschaft, Dresden, Germany Application February 24, 1939, Serial No. 258,297
In Germany February 25, 1938

2 Claims. (Cl. 88—16.6)

This invention relates to improvements in stereoscopic cameras.

The use of extension lenses, as for instance so-called portrait attachments is well known, with still cameras as well as with motion picture apparatus. These extensions, particularly suitable for taking pictures of objects close to the camera, are ordinarily applied to the lens of the camera in front thereof. Similarly also in producing stereoscopic pictures of close objects, lens extensions are employed, one for each lens of the stereoscopic camera.

In utilizing these lens extensions, it is then in stereoscopic cameras also necessary to modify the plane of convergence.

The present invention has the object of meeting the requirement of relocating the plane of convergence for stereoscopic cameras whenever these lens attachments are used.

It is also an object of the invention to provide extension lenses in combination with deflecting elements adapted to produce the required convergence.

It is also an object of the invention to provide an attachment for the objectives of a stereoscopic camera adapted to modify the focal length, as called for in making exposures of close objects, and at the same time to change the convergency of the objective as demanded by the closeness of the object.

A specific object of the invention is, furthermore, to attain the desired variation of the focal length and of the plane of convergence by means of a single lens of a diameter large enough to be positioned in front of both stereoscopic objectives of the camera. This lens not only alters the focal length of the lens combination from that of the stereoscopic objectives, but it also modifies the plane of convergence, since it acts as a deflecting element for the light passing through each of the stereoscopic objectives.

Upon using a single extension lens, in front of both stereoscopic camera lenses, the plane of convergence will coincide with its focal plane. When the objectives of the camera combined with the single extension lens are set to infinite distance the plane of convergence will then lie in the plane of maximum sharpness. When, however, the objectives of the camera are adjusted for a shorter distance the plane of convergence still remains in the focal plane of the single extension lens. This is, in many instances, not desirable.

The invention, therefore, also has the object of effecting the shifting of the plane of convergence in accordance with the distance of the object from the camera by altering the distance between the stereoscopic objectives of the camera, that is the base of the stereoscopic equipment. Upon variation of this base the deflecting effect of the single extension lens on the light rays passing through the stereoscopic objectives of the camera also must necessarily vary. This alteration of the stereoscopic base may be obtained for instance by slidably mounting the objectives on the lens board and sliding them away from or toward each other.

The invention also has the object of varying the location of the plane of convergence from the plane determined by the focal plane of the single extension lens without sliding the camera objectives relatively to the extension lens.

The invention, therefore, also has the object of effecting a variation in the distance of the plane of convergence by means of additional deflecting elements for the extension lens or lenses, in which case the base of the stereoscopic equipment may be left unaltered.

With these and many other objects in view, the invention is described in the following specification in which reference is made to the accompanying drawing.

In the drawing:

Fig. 1 shows diagrammatically a pair of compound lenses for a stereoscopic camera with lens extensions.

Fig. 2 shows diagrammatically a single mount for a pair of lens extensions.

Figs. 3 and 4 show diagrammatically stereoscopic lens arrangements with single extension lenses.

In the embodiment diagrammatically illustrated in Fig. 1, the lens equipment of a stereoscopic camera comprises the compound lenses 1 and 2 adapted to produce stereoscopic pictures on the carrier (not shown) of the sensitized emulsion, as indicated at 3 and 4. Extensions each comprising a lens and a deflecting element are adapted to be positioned in front of the compound lenses 1 and 2, respectively. The extension lens 5 and deflecting prism 6 are associated with the compound lens 1, while the extension lens 7 and deflecting element 8 are associated with the compound lens 2.

It is advisable to support the lens extensions and the pertaining deflecting elements, the latter in the form of prismatic wedges, in a common mount and to equip the common mount for these two elements with means for readily attaching the same to the lens mount of the stereoscopic camera.

It is particularly advisable to arrange the compound extensions 5, 6 and 7, 8 respectively in such manner that they may be detachably secured in the same position on a camera in which also another stereoscopic extension having a great base for making long distance exposures may be selectively secured.

An optical equipment of this type is diagrammatically illustrated in Fig. 2. The optical equipment adapted to be positioned on the casing (not shown) of a still camera or motion picture camera comprises a mount 11 containing stereoscopic compound lenses 9 and 10. It has at one end means for detachably securing it to the lens board, as for instance, the flanges 111, 112 of which at least one may be a bayonet lock flange. The tubular portion 102 of the mount 11 contains the compound lenses 9 and 10 at the required base spacing to produce stereoscopic pictures in the plane of the carrier of the emulsion (not shown).

An extension mount 12 supports therein the extensions 5, 6 and 7, 8 correspondingly spaced. They include each an extension lens and a prismatic deflecting element associated therewith. This mount may be detachably secured on the removable stereoscopic mount 11 by means of a flange 104 engaging a holding element 13 on the stereoscopic mount, as by a bayonet lock or the like.

Fig. 3 diagrammatically illustrates a stereoscopic equipment of a camera having two objectives 14 and 15. An extension lens 16 permitting the photographing of objects close to the camera is of a sufficiently great diameter to be removably positioned forward of both of the lenses 14 and 15. Rays of light indicated at 18, 19 and emanating from focus 17 of the extension lens 16 are deflected by said extension lens into the axes of the stereo-lenses 14, 15 and towards the emulsion areas indicated at 20 and 21. These rays will then strike the central portions of the picture areas 20 and 21 which are in that relation to each other that is required for the production of stereoscopic pictures. The point of convergence here coinciding with the focus 17 of the extension lens also lies in the plane of maximum sharpness of the system, provided the lenses 14, 15 are set for infinite distance.

The embodiment illustrated in Fig. 4 diagrammatically shows means for effecting the variation of the plane of convergence by combining an extension lens with wedge-shaped deflecting elements. The camera lenses 14, 15 permanently associated with the camera may have a fixed base, and are adapted to produce stereoscopic pictures of an object within the areas 20, 21 of the emulsion carrier (not shown). The extension lens 16 removably positioned forward of both camera lenses 14, 15 in the manner indicated in Fig. 3 to act as a light deflecting element is additionally equipped with removable and exchangeable deflecting elements 22, 23 which owing to their prismatic shape produce an additional deflection and hence a reduction of the distance of the plane of convergence from the camera and permitting thereby objects quite close to the camera to be photographed stereoscopically.

From the above it will be seen that the invention provides in combination with stereoscopic objectives a plurality of different readily attachable means for reducing the distance between the objectives and the plane of convergence, thereby bringing the plane of maximum sharpness closer to the camera. It will also be seen that these means are readily adjustable to modify the location of this plane of convergence.

I claim:

1. The combination with the optical system of a stereoscopic camera, which optical system comprises two similar photographic objectives arranged with their axes spaced from each other and relatively to a sight axis to produce separate pictures having stereoscopic relation, of optical ray deflecting means detachably mounted in front of said optical system for producing stereoscopic pictures from objects which are spaced from the optical system a distance less than the minimum distance which normally is required when said two photographic objectives are used alone to produce sharply focused stereoscopic pictures, said optical ray deflecting means comprising a simple collective lens of a diameter sufficiently large to cover both said photographic objectives and two optical wedges spaced from said collective lens and facing the object to be photographed, each wedge covering one half of said collective lens, one of said wedges being mounted in axial alinement with one of said objectives and the other wedge being in axial alinement with the other objective when said ray deflecting means is mounted in front of said optical system.

2. The combination with the optical system of a stereoscopic camera, which optical system includes within a single mount two similar photographic objectives arranged with their axes spaced from each other and relatively to a sight axis to produce separate pictures having stereoscopic relation, of optical ray deflecting means in another mount provided with means for detachably securing the same to the mount of said optical system so that said optical ray deflecting means is positioned in front of said two photographic objectives, said optical ray deflecting means permitting the production of stereoscopic pictures from objects which are spaced from the optical system a distance less than the minimum distance which is normally required, when said two photographic objectives are used alone, to produce sharply focused stereoscopic pictures, said optical ray deflecting means comprising a simple collective lens of a diameter sufficiently large to cover both said photographic objectives and two optical wedges spaced from said collective lens and facing the object to be photographed, each wedge covering one half of said collective lens, one of said wedges being mounted in axial alinement with one of said objectives and the other wedge being in axial alinement with the other objective when said ray deflecting means is mounted in front of said optical system.

HANS SAUER.